United States Patent [19]

Sellers et al.

[11] Patent Number: 5,573,283
[45] Date of Patent: Nov. 12, 1996

[54] BRANCHED HOSE CONSTRUCTION, PART THEREFOR AND METHODS OF MAKING THE SAME

[75] Inventors: Randall E. Sellers, Candler; Philip K. Loyer, Waynesville, both of N.C.

[73] Assignee: Dayco Products, Inc., Dayton, Ohio

[21] Appl. No.: 376,502

[22] Filed: Jan. 23, 1995

[51] Int. Cl.⁶ .................................................... F16L 41/00
[52] U.S. Cl. ............................ 285/93; 285/155; 285/156; 285/292; 285/371; 29/890.144
[58] Field of Search ..................................... 285/156, 155, 285/93, 292, 371; 29/890.144

[56] References Cited

U.S. PATENT DOCUMENTS

| | | | |
|---|---|---|---|
| 1,936,805 | 11/1933 | Taylor | 285/93 |
| 2,344,424 | 3/1944 | Singleton | 285/93 |
| 3,480,300 | 11/1969 | Jeffery et al. | 285/93 |
| 4,648,628 | 3/1987 | Meadows et al. | 285/24 |
| 4,654,942 | 4/1987 | Rush et al. | 29/157 T |
| 5,033,775 | 7/1991 | Matte et al. | 285/150 |
| 5,335,944 | 8/1994 | Mitsui et al. | 285/156 |

*Primary Examiner*—Dave W. Arola
*Attorney, Agent, or Firm*—Joseph V. Tassone

[57] ABSTRACT

A branched hose construction, part therefor and methods of making the same are provided, the method comprising the steps of disposing a mark on a length of hose that straddles the location where the hose is to be cut into two hose sections whereby the cutting of the length of hose into the two hose sections provides two parts of the mark respectively on the cut ends of the two hose sections, aligning the parts of the mark with orienting means on a T-connector during the step of telescoping the cut ends of the two hose sections onto the opposite ends of the T-connector so that such oriented relation is permanently maintained after a sleeve-like member has been injection molded from polymeric material over the cut ends of the hose section and a part of the T-connector body that is exposed between the cut ends of the two hose sections.

20 Claims, 9 Drawing Sheets

5,573,283

BRANCHED HOSE CONSTRUCTION, PART THEREFOR AND METHODS OF MAKING THE SAME

BACKGROUND OF THE INVENTION

1. Field of the Invention

This invention relates to a new branched hose construction and to a new method of making such a new branched hose construction as well as to a new part for such a branched hose construction and to a new method of making such a new part.

2. Prior Art Statement

It is known to provide a method of making a branched hose construction comprising the steps of providing a T-connector that has a body portion provided with two opposite ends and a branch end extending outwardly therefrom intermediate the opposite ends, cutting a length of hose into two hose sections so that the two hose sections respectively have cut ends, telescoping the cut ends of the two hose sections respectively on the opposite ends of the T-connector, and then injection molding a polymeric material over the cut ends of the two hose sections and the part of the T-connector body that is exposed between the ends of the two hose sections to form a sleeve-like member through which the branch end extends and which holds the ends of the two hose sections on the opposite ends of the T-connector. For example, see the U.S. patent to Matte et al, U.S. Pat. No. 5,033,775.

Also see the U.S. patent to Meadows et al, U.S. Pat. No. 4,648,628, for other examples of branched hose constructions that utilize T-connectors.

Also see the U.S. patent to Rush et al No. U.S. Pat. No. 4,654,942 for other types of branched hose constructions.

SUMMARY OF THE INVENTION

It is one of the features of this invention to provide a new method of making a branched hose construction wherein an injection molded sleeve-like member of polymeric material holds the ends of two hose sections respectively on opposite ends of a T-connector while the T-connector provides an orienting function with the two hose sections so that the subsequently hardened sleeve-like member permanently holds the T-connector and the two hose sections in a desired oriented relation.

For example, one embodiment of this invention comprises a method of making a branched hose construction comprising the steps of providing a T-connector that has a body portion provided with two opposite ends and a branch end extending outwardly therefrom intermediate the opposite ends, cutting a length of hose into two hose sections so that the two hose sections respectively have cut ends, telescoping the ends of the two hose sections respectively on the opposite ends of the T-connector, then injection molding a polymeric material over the cut ends of the two hose sections and the part of the T-connector body that is exposed between the cut ends of the two hose sections to form a sleeve-like member through which the branch end extends and which holds the cut ends of the two hose sections on the opposite ends of the T-connector, disposing a mark on the length of the hose that straddles the location where the hose is to be cut into the two hose sections whereby the step of cutting the length of the hose into the two hose sections provides two parts of the mark respectively on the cut ends of the two hose sections, and aligning the parts of the mark with orienting means of the T-connector during the step of telescoping the cut ends of the two hose sections onto the opposite ends of the T-connector so that such oriented relation is permanently maintained after the sleeve-like member has hardened.

Accordingly, it is an object of this invention to provide a new method of making a branched hose construction, the method of this invention having one or more of the novel features of this invention as set forth above or hereinafter shown or described.

Another object of this invention is to provide a new branched hose construction having one or more of the novel features of this invention as set forth above or hereinafter shown or described.

Another object of this invention is to provide a new part for such a branched hose construction, the part of this invention having one or more of the novel features of this invention as set forth above or hereinafter shown or described.

Another object of this invention is to provide a new method of making such a new part, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
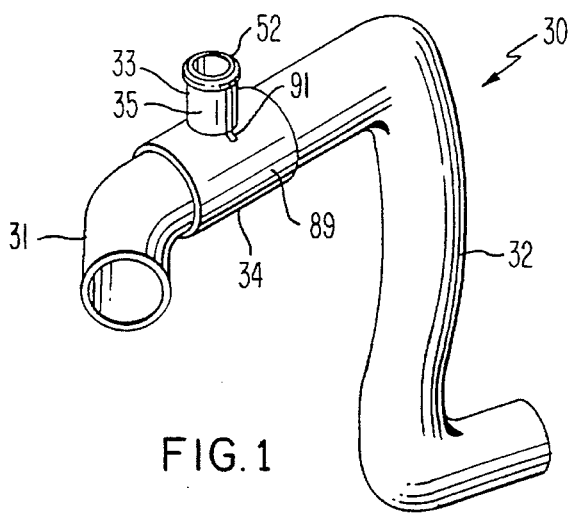
FIG. 1 is a perspective view of a new branched hose construction of this invention.

While the various features of this invention are hereinafter illustrated and described as providing branched hose constructions of particular configurations, it is to be understood that the various features of this invention can be utilized singly or in various combinations thereof to provide a branched hose construction having any other configuration as desired.

Therefore, this invention is not to be limited to only the embodiments illustrated in the drawings, because the drawings are merely utilized to illustrate some of the wide variety of uses of this invention.

Referring now to FIG. 1, a new branched hose construction of this invention is generally indicated by the reference numeral 30 and comprises two hose sections 31 and 32 oriented together by a T-connector 33 and being permanently held in such oriented relation by a sleeve-like member 34 of polymeric material that has been injection molded onto the hose sections 31 and 32 and T-connector 33 in a manner hereinafter set forth so that a branch 35 of the T-connector 33 extends outwardly from the sleeve-like member 34 to be interconnected to a hose branch (not shown) in a manner well known in the art. For example, see the aforementioned U.S. patent to Meadows et al, No. U.S. Pat. No. 4,648,628, the U.S. patent to Rush et al, U.S. Pat. No. 4,654,942 and the U.S. patent to Matte et al, U.S. Pat. No. 5,033,775 whereby these three U.S. patents are being incorporated into this disclosure by this reference thereto.

Since the use of a branched hose construction in the engine compartment of a transportation vehicle or the like is well known in the art from the aforementioned three U.S. patents, a further discussion of the purpose and use of the branched hose constructions of this invention need not be set forth so that the following description will be directed to the structure of the branched hose constructions and the methods of making the same.

Figure 13:
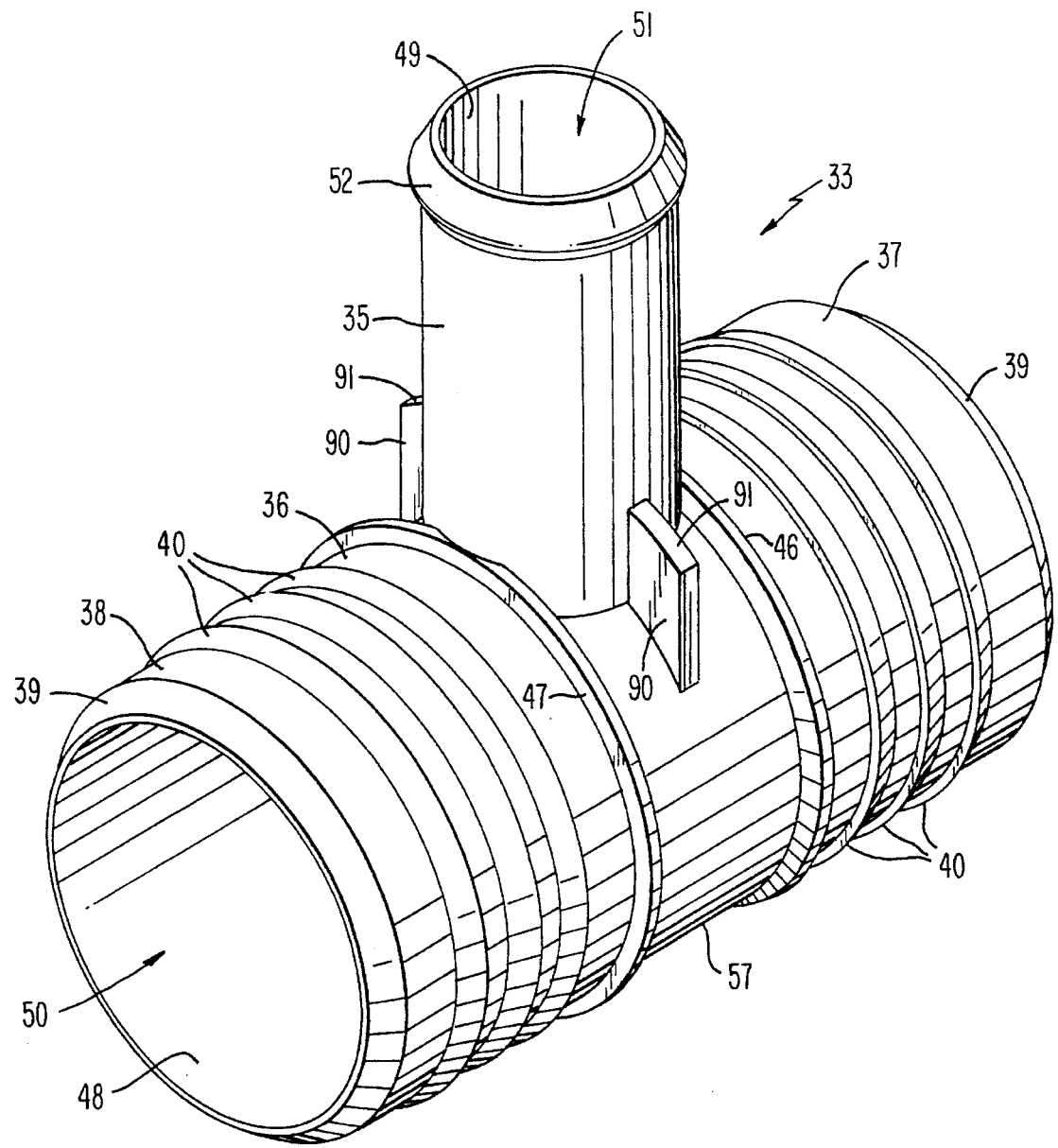
FIG. 13 is an enlarged perspective view illustrating the new T-connector of this invention that is utilized to form the branched hose construction of FIG. 1.

The T-connector 33 is best illustrated in FIG. 13 and is formed from any suitable polymeric material. In one working embodiment of this invention, the T-connector 33 is formed from a glass-filled nylon resin sold by the Du Pont Corporation of Wilmington, Del. as Zytel FE5105 with a color of BK083. In fact, in such one working embodiment of this invention, the sleeve-like member 34 is formed of the same polymeric material as the T-connector 33.

Figure 7:
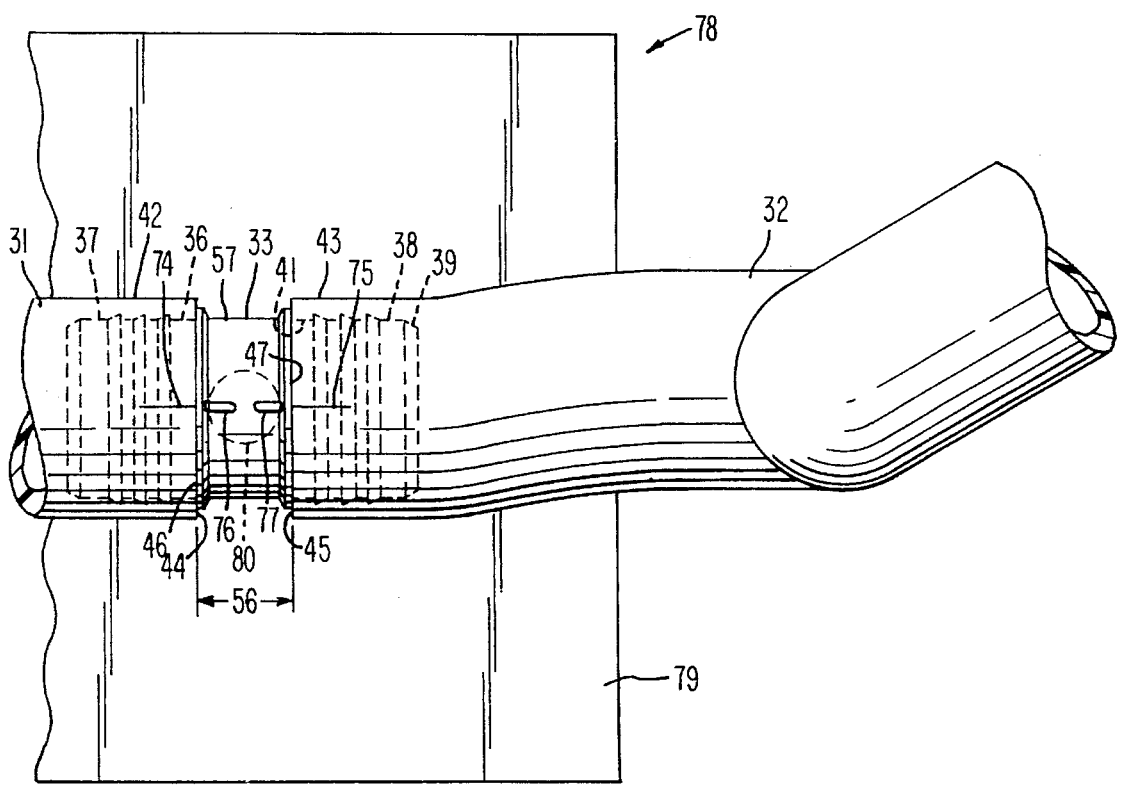
FIG. 7 is a view similar to FIG. 6 and illustrates how the other hose section is telescoped onto its respective end of the T-connector and is aligned with orienting means thereof.
Figure 8:
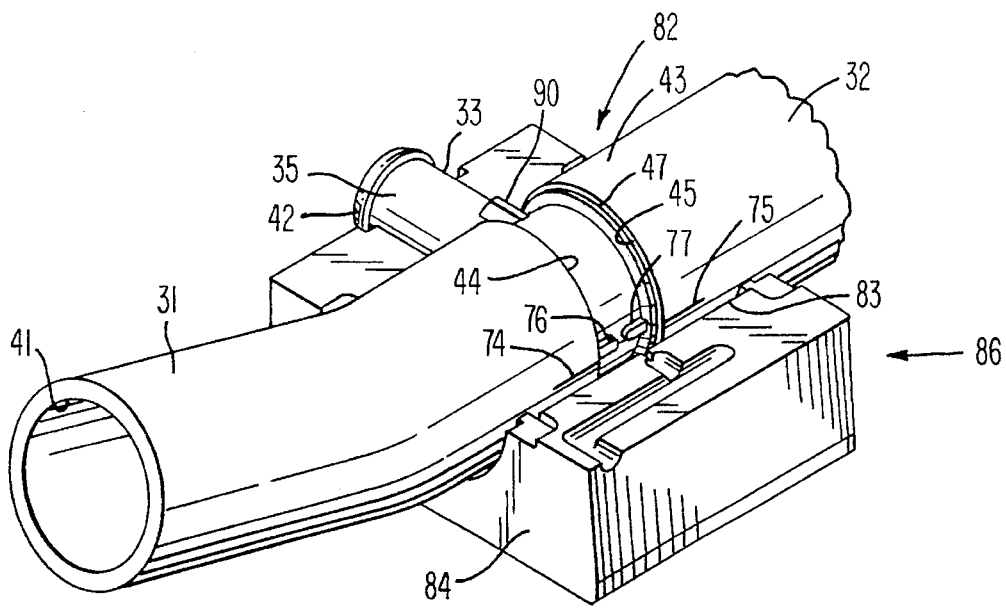
FIG. 8 is a fragmentary perspective view illustrating how the assembly of the T-connector and the two hose sections of FIG. 7 are placed in one-half an injection molding apparatus.
Figure 9:
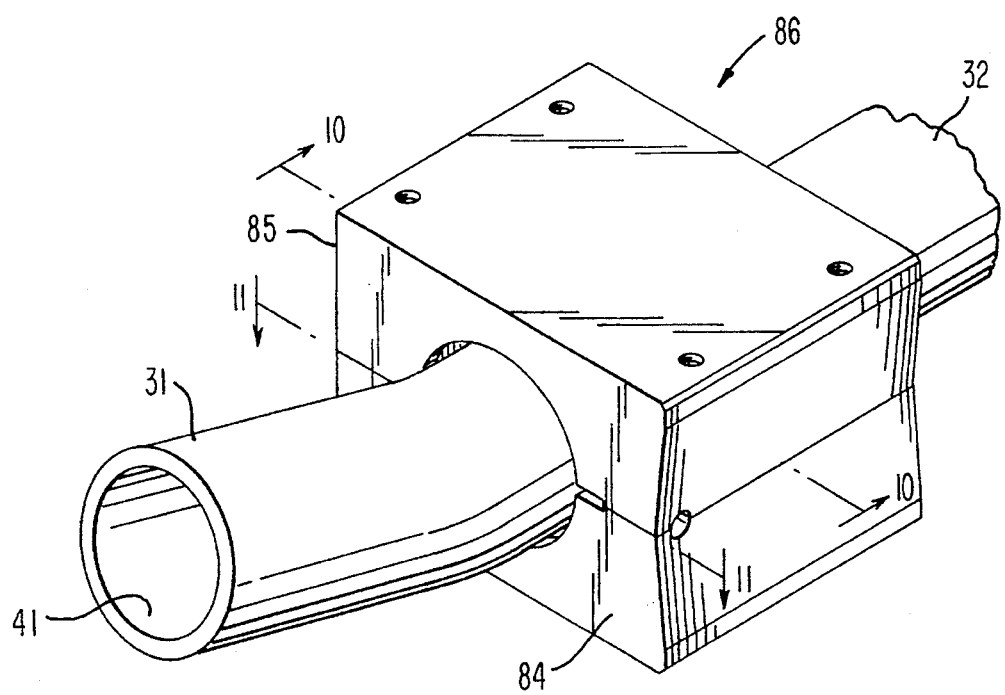
FIG. 9 is a perspective view similar to FIG. 8 and illustrates the injection molding apparatus in its completed form around the assembly of the T-connector and the hose sections of FIG. 8.

The T-connector 33 has a substantially cylindrical tubular body 36 provided with like opposed ends 37 and 38 and respectively having angled external leading surface means 39 and a plurality of outwardly directed annular ridges 40 for gripping into the internal peripheral surface means 41 of the respective hose sections 31 and 32 when cut ends 42 and 43 of the respective hose sections 31 and 32 are telescoped onto the respective ends 37 and 38 of the T-connector 33 and have respective end edges 44 and 45 thereof respectively butting against annular shoulder means 46 and 47 formed on the T-connector 33 as illustrated in FIG. 7.

Figure 15:
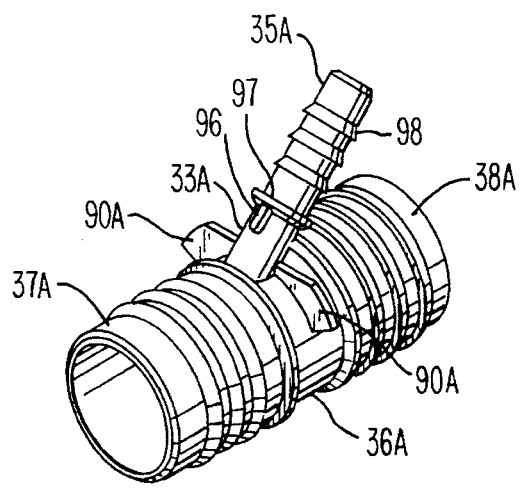
FIG. 15 is an enlarged perspective view illustrating another new T-connector of this invention that is utilized in forming the branched hose construction of FIG. 14.
Figure 16:
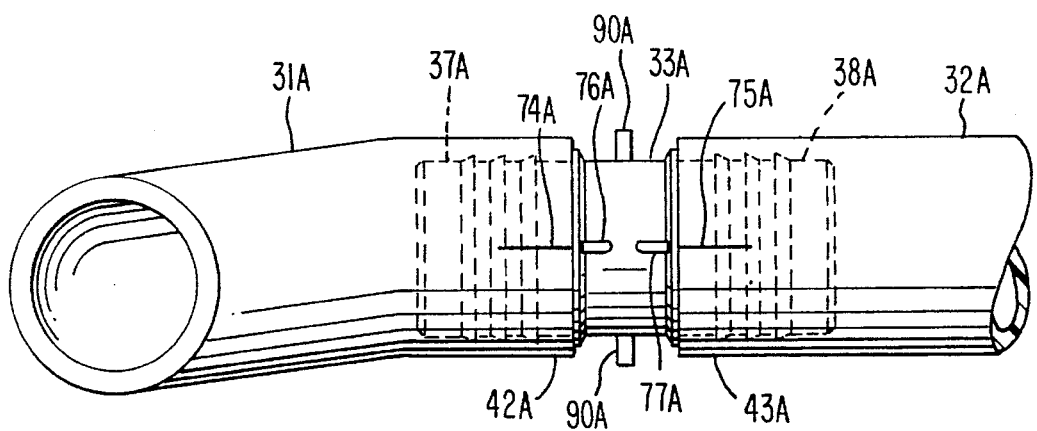
FIG. 16 is a view similar to FIG. 7 and illustrates how the two hose sections of the branched construction of FIG. 14 are telescoped respectively on the opposite ends of the T-connector of FIG. 15 in an aligned manner with the orienting means of the T-connector.
Figure 17:
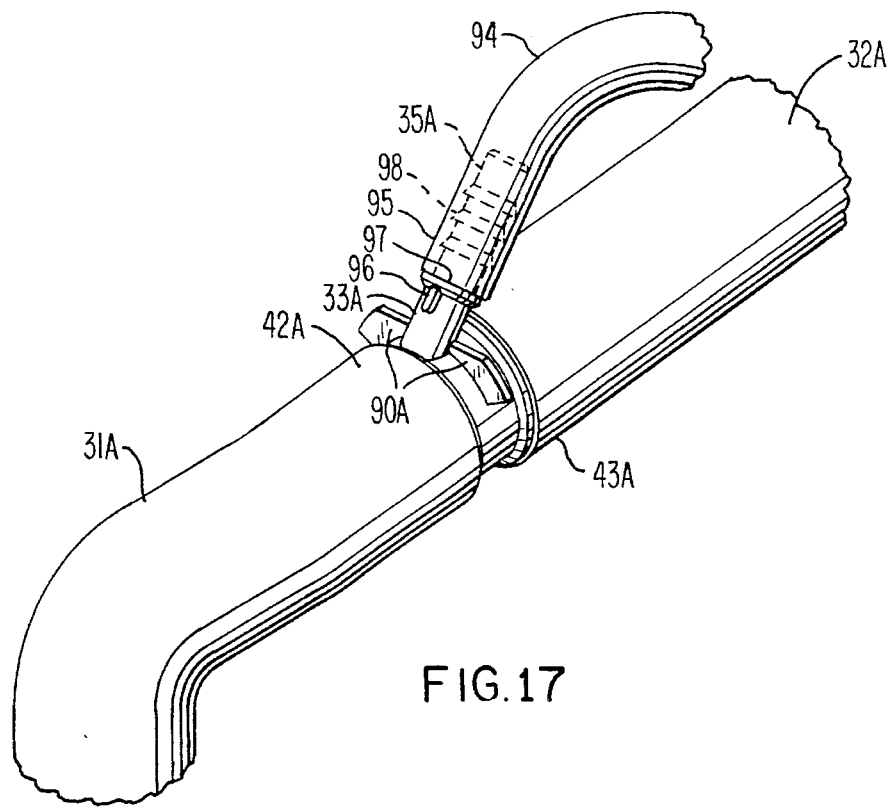
FIG. 17 is a fragmentary perspective view of the assembly of FIG. 16 and illustrates how a hose branch is telescoped onto the branch of the T-connector before the sleeve-like member is molded on the assembly of FIG. 17.
Figure 18:
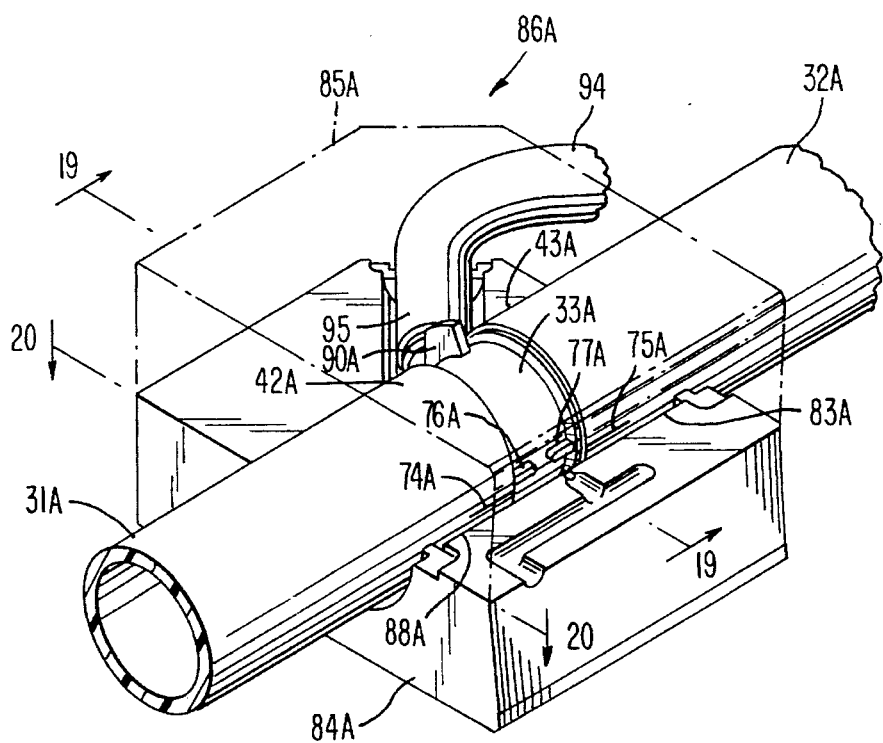
FIG. 18 is a fragmentary perspective view illustrating how the assembly of FIG. 17 is disposed in an injection molding apparatus of this invention, FIG. 18 showing one-half of the injection molding apparatus in phantom lines in order to facilitate the viewing of the branched hose assembly therein.

The tubular branch 35 of the T-connector 33 extends radially outwardly from the body portion 36, is integral and one-piece therewith and is disposed substantially perpendicular to the longitudinal axis through the tubular body 33. However, it is to be understood that the branch 35 could extend outwardly from the body 33 at any desired angle relative thereto. For example, see the T-connector 33A of FIG. 15 wherein the branch 35A thereof extends at an angle relative to the cylindrical body 36A of the T-connector 33A and which will be hereinafter described.

The T-connector 33 has an interior wall means 48 that is substantially cylindrical and the tubular branch 35 has a cylindrical interior wall means 49 that intersects with the wall means 48 of the body portion 36 so that a resulting passage means 50 extends completely through the body portion 33 from one end 37 thereof to the other end 38 thereof and the branch 35 has a branch passage 51 passing therethrough and intersecting with the passage 50.

The tubular branch 35 terminates in an outer annular projection 52 to facilitate gripping into the internal peripheral surface of a hose branch (not shown) subsequently telescoped thereon as set forth in the aforementioned U.S. patents.

The hose sections 31 and 32 of the branched hose construction 30 of this invention each has a unique configuration to permit the hose construction 30 to be located in the proper space in the engine compartment of a transportation vehicle or the like. In fact, the hose sections 31 and 32 originally comprise a one-piece length of hose 53, FIG. 2, that has been molded in a particular configuration so that when the hose length 53 is subsequently cut along a line 54, FIG. 4, while the length of hose 53 is being held in a predetermined position thereof by an apparatus 55 of this invention, the length of hose 53 is formed into the two hose sections 31 and 32 with the cut edges 42 and 43 thereof respectively having the cut ends 44 and 45 thereof formed at the cut line 54 that is illustrated in FIG. 4.

Thus, since the cut edges 44 and 45 of the hose sections 31 and 32 will be spaced from each other when fully assembled on the T-connector 33 in the manner illustrated in FIG. 7 so that a spacing 56 will exist therebetween as provided by an exposed portion 57 of the T-connector 33, the length of hose 53 is initially molded with an overall length that takes into consideration the subsequent gap 56 that will exist between the hose sections 31 and 32 when making the branched hose construction 30 of this invention to fit in a particular arrangement in an engine compartment of a transportation vehicle or the like.

Figure 3:
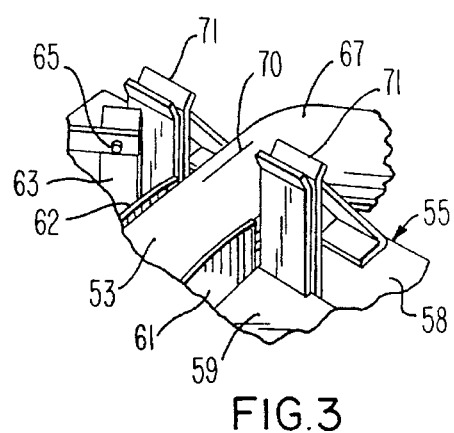
FIG. 3 is a fragmentary view similar to FIG. 2 and illustrates the mark having been disposed on the length of hose of FIG. 2.
Figure 2:
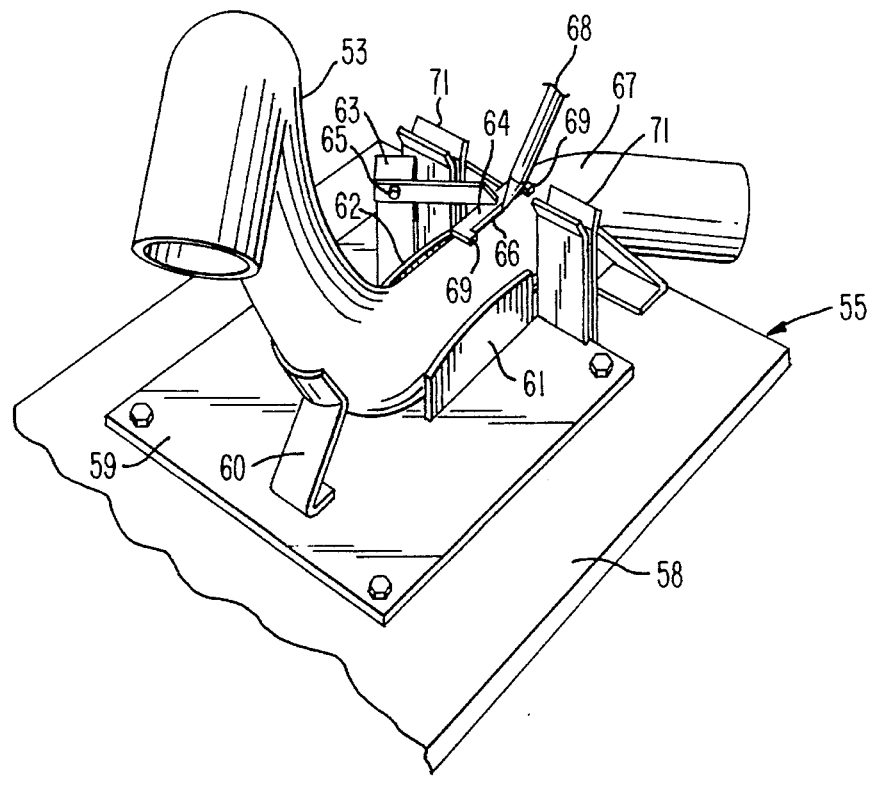
FIG. 2 is an enlarged fragmentary perspective view illustrating one of the steps in the method of this invention for making the branched hose construction of FIG. 1, FIG. 2 illustrating an apparatus of this invention for holding a length of hose in a fixed position so that a mark can be provided thereon.
Figure 4:
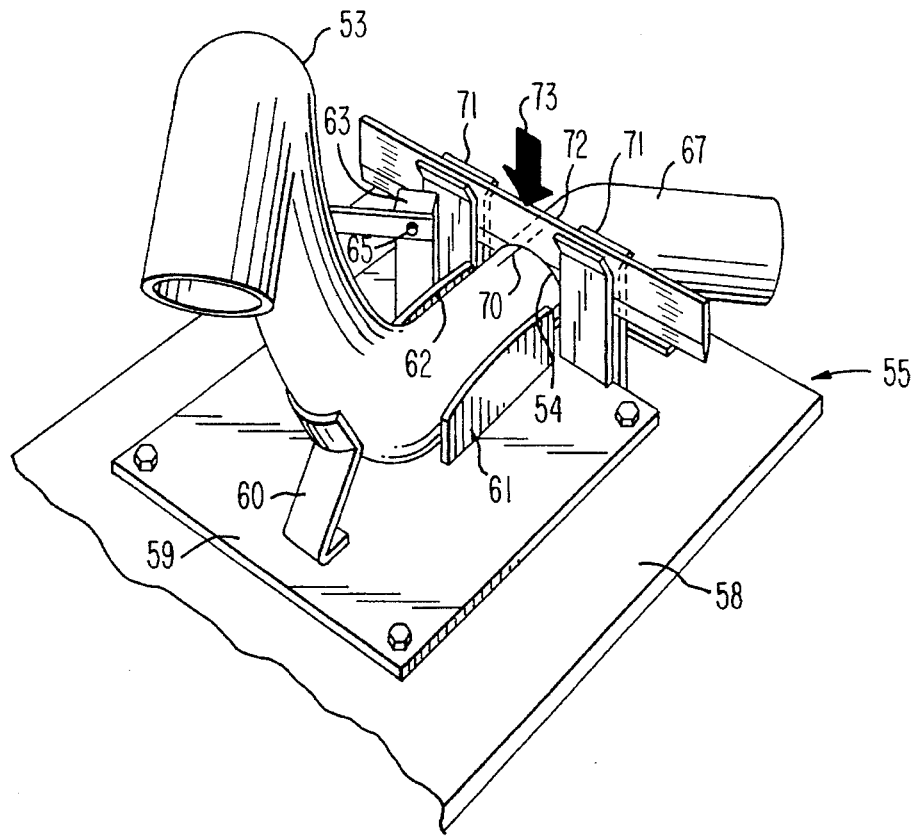
FIG. 4 is a view similar to FIG. 2 and illustrates how the length of hose is cut into two hose sections.

As illustrated in FIGS. 2, 3 and 4, it can be seen that the apparatus 55 comprises a support means 58 carrying a plate 59 having a plurality of positioning members 60, 61 and 62 for holding the length of hose 53 in the fixed position as illustrated in FIGS. 2 and 4.

A post 63 extends upwardly from the plate 59 and pivotally carries a marking guide 64 by means of a pivot pin 65 so that the guide 64 can be pivoted out of the way as illustrated in FIG. 4 by an operator and when pivoted toward the length of hose 53, a straight edge section 66 of the guide 64 will be disposed against the exterior peripheral surface 67 of the hose 53 in a predetermined position thereon so that when an operator utilizes a marking device 68 along the edge 66 of the guide 64 between stops 69 thereof, a straight line mark 70, FIG. 4, of a predetermined length will be formed on the exterior peripheral surface 67 of the length of hose 53 as illustrated in FIG. 4.

The plate 59 also carries two spaced apart cutter guide means 71 which guides a cutter bar 72 that is adapted to reciprocate back and forth in any suitable manner and be pushed downwardly against the length of hose 53 in the direction of the arrow 73 to cut through the hose length 53 to produce the resulting cut line 54 and cut the hose length 53 into the two hose sections 31 and 32, the cutter guide means 71 being so related to the mark 70 that the mark 70 is cut into two substantially equal parts 74 and 75 as illustrated in FIG. 7 so as to be subsequently and respectively aligned with orienting projections 76 and 77 formed on the portion 57 of the T-connector 33 as illustrated in FIG. 7 so that the branch 35 will be properly oriented with the particular configurations of the hose sections 31 and 32 as illustrated in FIG. 1.

Figure 5:
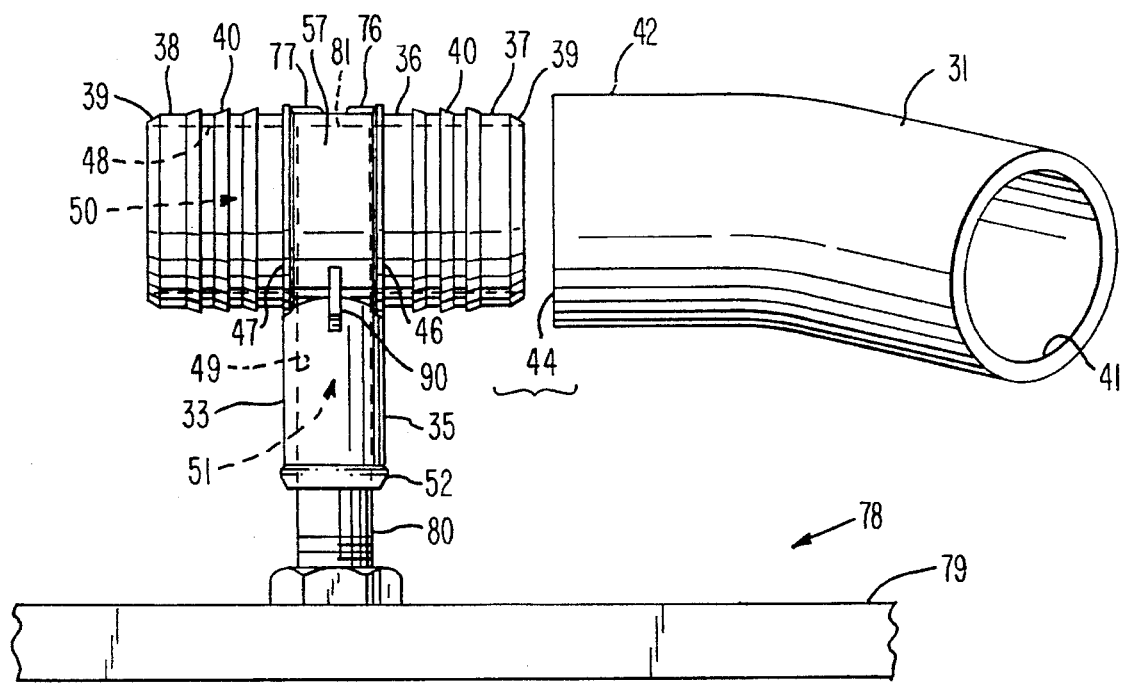
FIG. 5 is a fragmentary side view illustrating another apparatus of this invention utilized when the cut ends of the two hose sections of FIG. 4 are respectively telescoped onto opposite ends of a T-connector of this invention, FIG. 5 illustrating in exploded perspective view how one of the hose sections is to be telescoped onto one of the ends of the T-connector.
Figure 6:
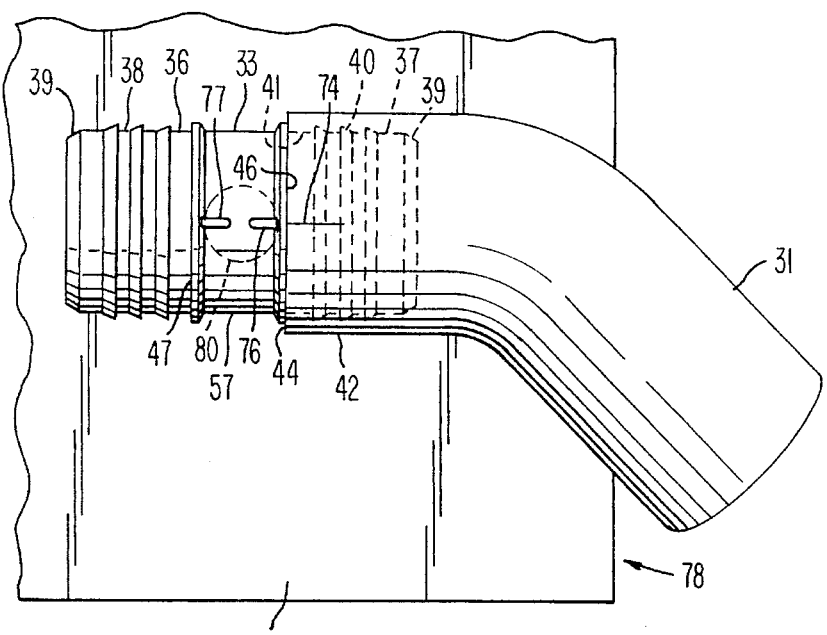
FIG. 6 illustrates how the one hose section of FIG. 5 is aligned with orienting means of the T-connector.

The cut hose sections 31 and 32 are assembled to a T-connector 33 of this invention by utilizing another apparatus of this invention that is generally indicated by the reference numeral 78 in FIGS. 5, 6 and 7 and comprising a plate 79 having a fixed cylindrical post 80 extending upwardly therefrom and on which the branch 33 of a T-connector 33 can be telescoped in the manner illustrated in FIG. 5 so that an upper free end 81 of the post 80 abuts against the internal peripheral surface 48 of the T-connector 33 before the end 52 of the tube 35 bottoms out against the plate structure 79 as illustrated in FIG. 5. In this manner, the T-connector 33 can swivel or rotate on the post 80 when the T-connector 33 is fully assembled to the post 80 as illustrated in FIG. 5.

The operator can then take the hose section 31 and force the cut end 42 thereof onto the end 37 of the T-connector 33 with one hand while holding the other end 38 of the T-connector 33, the hose end 42 being worked onto the end 37 by rotating the hose section 31 back and forth until the cut edge 44 thereof abuts against the annular shoulder means 46 as illustrated in FIG. 6. During such telescoping of the end 42 of the hose section 31 onto the end 37 of the T-connector 33, the operator aligns the part 74 of the mark 70 that is on the cut end 42 of the hose section 31 with the orienting projection 76 of the T-connector 33 in the manner illustrated in FIG. 6 so that the hose section 31 is properly oriented with the T-connector 33.

Thereafter, the operator can rotate the T-connector 33 around to the position illustrated in FIG. 7 and work the cut end 43 of the hose section 32 onto the end 38 of the T-connector 33 with one hand while holding the hose section 31 with the other hand, the cut end 43 of the hose section 32 being worked onto the end 38 of the T-connector 33 until the cut edge 45 thereof abuts against the annular shoulder means 47 of the T-connector 33 and with the part 75 of the mark 70 on the hose section 32 being aligned with the projection 77 of the T-connector 33 as illustrated in FIG. 6 so that the hose section 32 is properly oriented with the T-connector 33.

Figure 12:
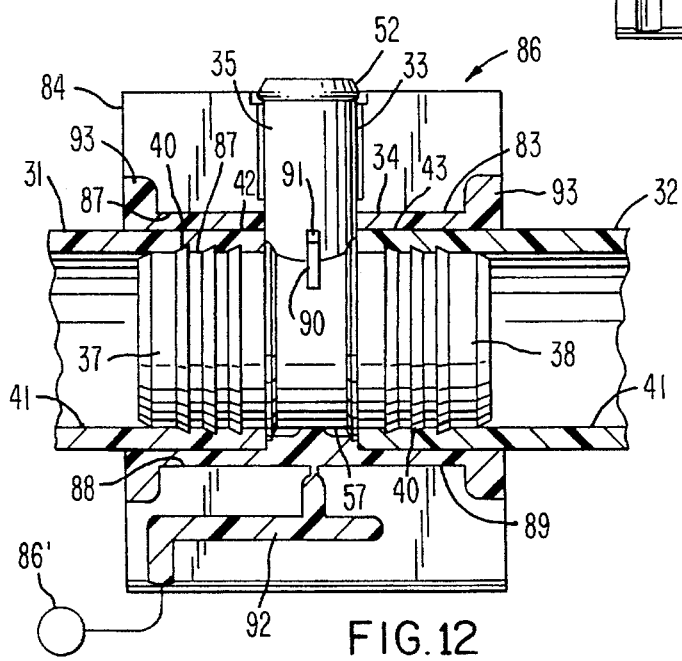
FIG. 12 is a view similar to FIG. 11 and illustrates how the sleeve-like member for the branched hose construction of FIG. 1 is injection molded onto the assembly of the T-connector and the two hose sections of FIG. 11.

Thus, once the hose sections 31 and 32 have been assembled to their respective T-connector 33 in the apparatus 78 in the orienting manner set forth above, a resulting assembly 82 comprising the parts 31, 32 and 33 can be removed from the apparatus 78 and be placed in a mold cavity 83 that is formed between two cooperating mold blocks 84 and 85 of an injection molding apparatus 86 as illustrated in FIGS. 8–12 which will mold the sleeve-like member 34 onto the assembly 82 to complete the hose construction 30 once the sleeve-like material 34 has hardened, the sleeve-like member 34 being formed from molten polymeric material being injected into the cavity 83 under pressure from a source 86', FIG. 12, which forms the sleeve-like member 34 over the cut ends 42 and 43 of the hose sections 31 and 32 as well as over the exposed part 57 of the T-connector 33 while molding around the branch 35 so that the branch 35 extends outwardly from the sleeve-like member 34 as illustrated in FIG. 12.

In this manner, it can be seen that the sleeve-like member 34 when hardened will hold the cut ends 42 and 43 of the hose sections 31 and 32 onto the ribs 40 of the respective ends 37 and 38 of the T-connector 33 as the hardening material of the sleeve 34 causes the same to shrink about approximately 0.55% to 0.60%.

Once the polymeric material of the sleeve 34 has hardened, the resulting hose construction 30 can be removed from the mold blocks 84 and 85 and will be in the configuration of FIG. 1 as the sleeve-like member 34 holds the cut ends 42 and 43 of the hose sections 31 and 32 in their oriented relation with the T-connector 33.

In addition, it can be seen that the length of the sleeve-like member 34 is such that the same completely covers the parts 74 and 75 of the mark 70 on the hose sections 31 and 32.

Figure 10:
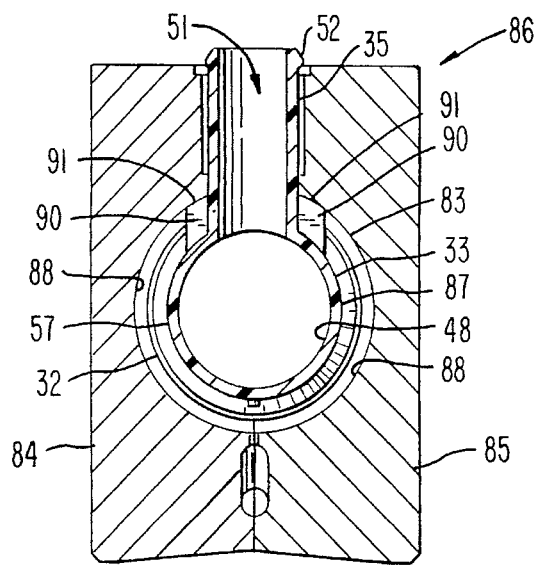
FIG. 10 is a cross-sectional view taken on line 10—10 of FIG. 9.
Figure 11:
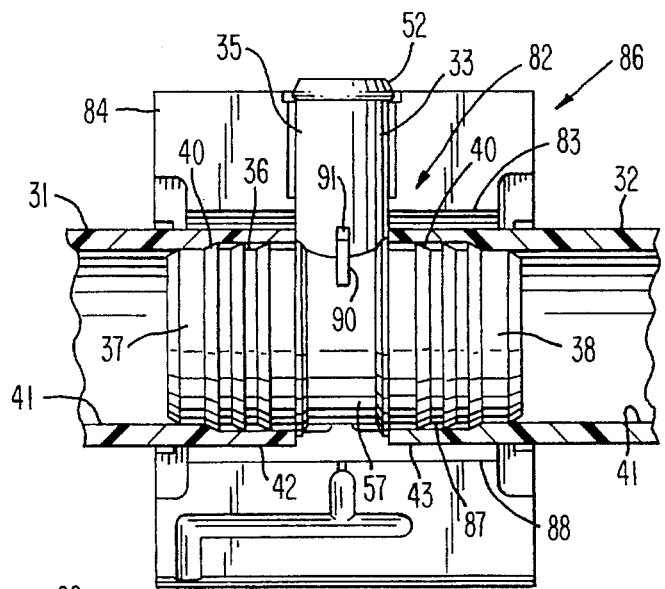
FIG. 11 is a cross-sectional view taken on line 11—11 of FIG. 10.

In order to ensure an equal spatial relationship between the outer peripheral surface means 87 of the cylindrical body 36 of the T-connector 33 and the internal peripheral surface 88 of the mold blocks 84 and 85 that will form an outer peripheral surface 89 of the sleeve-like member 34, the part 57 of the T-connector 33 has a pair of wing-like members 90 on each side of the tubular branch 35 as illustrated in FIG. 10 which have outer arcuate edges 91 that abut against the interior peripheral surface 88 of the mold cavity 83.

It has been found in one working embodiment of this invention that a shuttle press can be utilized with the mold blocks 84, 85 and the mold blocks 84, 85 may be angled in such press to keep the hose from displacing the T-connector 33 as a portion of the hose may contact the frame of the press.

Of course, after the sleeve-like member 34 has been injection molded in the manner previously described, the resulting runner 92 and sprues 93 are removed from the sleeve-like member 34.

As previously stated, the material of the sleeve-like member 34 and the T-connector 33 can be the same polymeric material but it has been found that there is no bonding between these two parts 34 and 33 although it is believed that polymeric materials could be utilized wherein such bonding would take place, if desired.

While the branched hose construction 30 previously described does not have a hose branch on the branch 35 of the T-connector 33, it is to be understood that a hose branch could be disposed on the branch 35 of the T-connector 33 and have an adjacent end thereof covered by a tubular portion of the sleeve-like member 34 if desired.

For example, such an arrangement is provided by another branched hose construction 30A of this invention that is illustrated in FIGS. 14–21 and parts thereof similar to the parts of the hose construction 30 previously described are indicated by like reference numerals followed by the reference letter "A".

Figure 14:
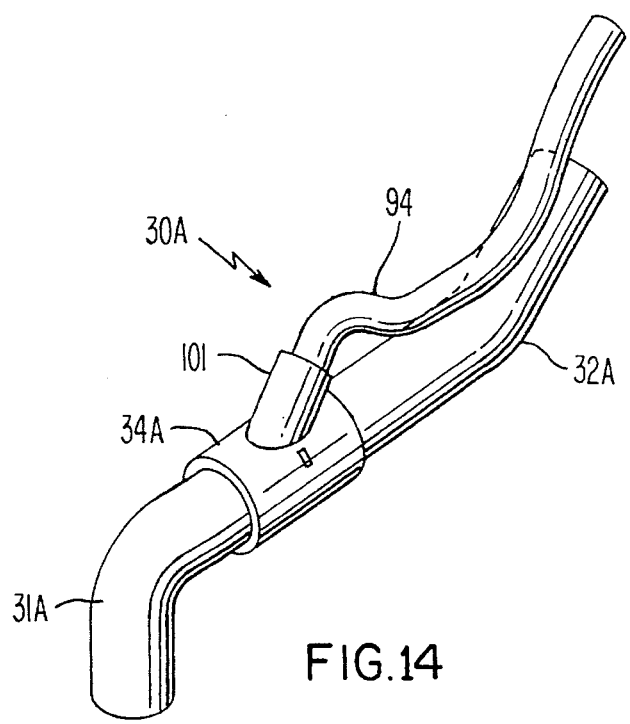
FIG. 14 is a view similar to FIG. 1 and illustrates another new branched hose construction of this invention.
Figure 20:
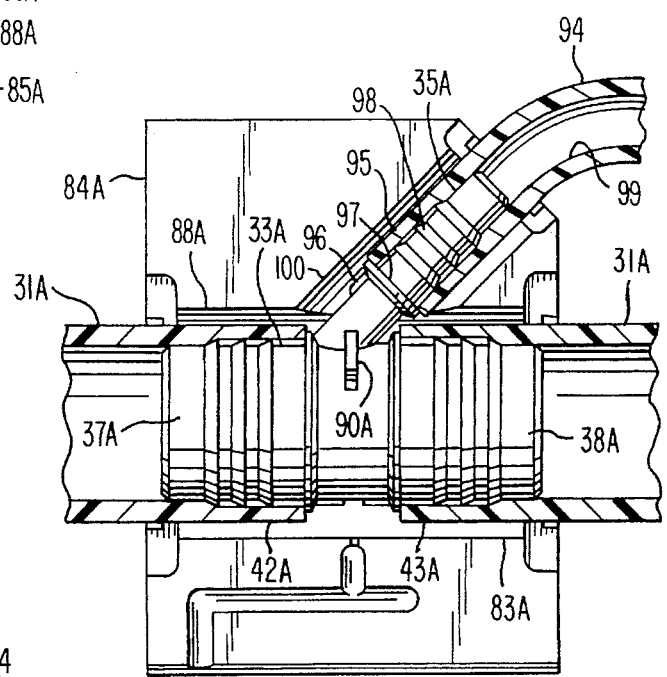
FIG. 20 is a fragmentary cross-sectional view taken on line 20—20 of FIG. 18.

As previously stated, not only does the branch 35A of the T-connector 33A for the branched hose construction 30A extend at an angle relative to the main body 36A thereof, but also a hose branch 94 has an end 95 thereof telescoped on the branch 35A of the T-connector 33A and the same can be provided with a mark (not shown) which orients with a projection 96 of the branch 35A when the end 95 of the hose branch 94 abuts against an annular shoulder means 97 of the branch 35A as illustrated in FIG. 20. Thus, if the hose branch 94 has a particular contour thereof as illustrated in FIG. 14, the same will be properly oriented relative to the hose sections 31A and 32A which have been oriented relative to the T-connector 33A by the mark parts 74A and 75A orienting in alignment with the projections 76A and 77A of the T-connector 33A in the manner previously described.

In addition, the branch 35A of the T-connector 36A has annular ridges 98 extending outwardly therefrom to dig into the internal peripheral surface means 99 of the branch end 95 when the sleeve-like member 34A subsequently hardens and shrinks in the manner illustrated in FIG. 21.

Figure 19:
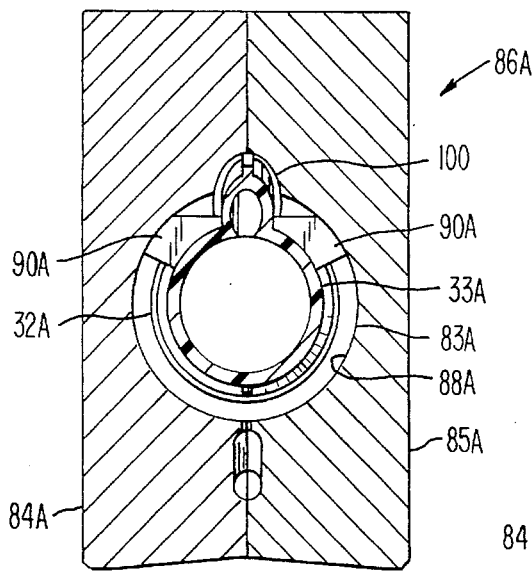
FIG. 19 is a cross-sectional view taken on line 19—19 of FIG. 18.
Figure 21:
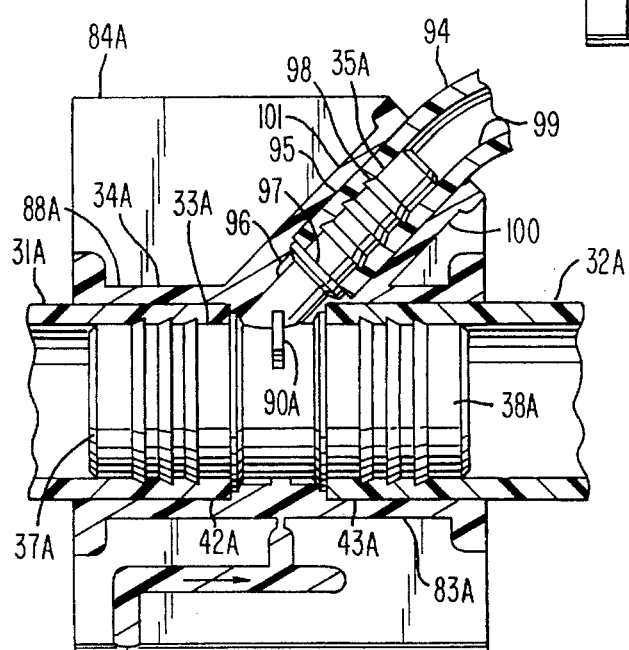
FIG. 21 is a view similar to FIG. 20 and illustrates how the sleeve-like member is injection molded onto the assembly of FIG. 20 to complete the branched hose construction of FIG. 14.

In addition, it can readily be seen in FIGS. 19–21 that the mold cavity 83A formed by the mold blocks 84A and 85A of the apparatus 86A has a section 100 which extends along the end 95 of the branch hose 94 to form a tubular part 101 on the sleeve-like member 34A which holds the end 95 of the hose branch 94 on the branch 35A in the same manner that the ends 42A and 43A of the hose sections 31A and 32A are held onto the ends 37A and 38A of the T-connector 33A by the sleeve-like member 34A as previously described.

Therefore, it can be seen that the hose sections 31A and 32A can be respectively cut from a length of hose (not shown) in the apparatus 55 so as to result in having the mark parts 74A and 75A for alignment with the orienting projections 76A and 77A of the T-connector 33A in the apparatus 78 previously described.

In addition, it can be seen that the T-connector 36A has the wing-like parts 90A for providing the spaced relation between the body portion 36A of the T-connector 33A and the cavity wall means 88A as previously described.

Therefore, it can be seen that this invention not only provides a new branched hose construction and a new method of making such a new branched hose construction, but also this invention provides a new part for such a branched hose construction and a new method of making such a new part.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a branched hose construction comprising a T-Connector that has a body portion provided with two opposite ends and a branch end extending outwardly therefrom intermediate said opposite ends, two hose sections that have been cut from a length of hose so as to respectively have cut ends, said cut ends of said two hose sections respectively telescoped onto said opposite ends of said T-connector, and a sleeve-like member injection molded from a polymeric material over said cut ends of said two hose sections and a part of said T-connector body that is exposed between said cut ends of said two hose sections to form said sleeve-like member through which said branch end extends and which holds said cut ends of said two hose sections on said opposite ends of said T-connector, the improvement comprising a mark disposed on said length of hose that straddles the location where said hose is cut into said two hose sections, said cut forming two parts of said mark respectively on said cut ends of said two hose sections, orienting means provided on said T-connector, said parts of said mark aligned with said orienting means when said cut ends of said two hose sections are tele-scoped onto said opposite ends of said T-connector to provide an oriented relation of said sections so that such oriented relation is permanently maintained by said sleeve-like member.

2. A branched hose construction as set forth in claim 1 wherein said mark comprises a straight line.

3. A branched hose construction as set forth in claim 2 wherein said two parts of said mark are substantially equal in length.

4. A branched hose construction as set forth in claim 1 wherein said sleeve-like member completely covers said two parts of said mark.

5. A branched hose construction as set forth in claim 1 wherein said orienting means of said T-connector are disposed on said part of said T-connector that is exposed between said cut ends of said two hose sections.

6. A branched hose construction as set forth in claim 5 wherein said orienting means comprise two spaced apart projections each having a longitudinal axis parallel to a longitudinal axis of said body portion and being coaxial with each other.

7. A branched hose construction as set forth in claim 1 wherein said body portion of said T-connector has centering means for cooperating with wall means of an injection mold cavity when said sleeve-like member is being molded.

8. A branched hose construction as set forth in claim 7 wherein said centering means comprises a pair of spaced apart wing-like projections disposed on opposite sides of said branch.

9. A branched hose construction as set forth in claim 1 and comprising a hose branch having an end telescoped on said branch of said T-connector, said sleeve-like member having a tubular part thereof disposed on said end of said hose branch to hold said end of said hose branch on said branch of said T-connector.

10. A branched hose construction as set forth in claim 9 wherein said branch is angled relative to said body portion of said T-connector.

11. In a method of making a branched hose construction comprising the steps of providing a T-connector that has a body portion provided with two opposite ends and a branch end extending outwardly therefrom intermediate said opposite ends, cutting a length of hose into two hose sections so that said two hose sections respectively have cut ends, telescoping said cut ends of said two hose sections respectively onto said opposite ends of said T-connector, and then injection molding a polymeric material over said cut ends of said two hose sections and the part of said T-connector body that is exposed between said cut ends of said two hose sections to form a sleeve-like member through which said branch end extends and which holds said cut ends of said two hose sections on said opposite ends of said T-connector, the improvement comprising the steps of disposing a mark on said length of hose that straddles the location where said hose is to be cut into said two hose sections, said step of cutting said length of hose into said two hose sections forming two parts of said mark respectively on said cut ends of said two hose sections, forming an orienting means on said T-connector, and aligning said parts of said mark with said orienting means during the step of telescoping said cut ends of said two hose sections onto said opposite ends of said T-connector to provide an oriented relation of said sections so that such oriented relation is permanently maintained after said sleeve-like member has hardened.

12. A method of making a branched hose construction as set forth in claim 11 and comprising the step of forming said mark to comprise a straight line.

13. A method of making a branched hose construction as set forth in claim 12 and comprising the step of forming said two parts of said mark to be substantially equal in length.

14. A method of making a branched hose construction as set forth in claim 11 and comprising the step of forming said sleeve-like member to completely cover said two parts of said mark.

15. A method of making a branched hose construction as set forth in claim 11 and comprising the step of forming said orienting means of said T-connector to be disposed on said part of said T-connector that is exposed between said cut ends of said two hose sections.

16. A method of making a branched hose construction as set forth in claim 15 and comprising the step of forming said orienting means to comprise two spaced apart projections each having a longitudinal axis parallel to a longitudinal axis of said body portion and being coaxial with each other.

17. A method of making a branched hose construction as set forth in claim 11 and comprising the step of forming said body portion of said T-connector to have centering means for cooperating with wall means of an injection mold cavity when said sleeve-like member is being molded.

18. A method of making a branched hose construction as set forth in claim 17 and comprising the step of forming said centering means to comprise a pair of spaced apart wing-like projections disposed on opposite sides of said branch.

19. A method of making a branched hose construction as set forth in claim 1 and comprising the steps of telescoping an end of a hose branch on said branch of said T-connector, and forming said sleeve-like member to have a tubular part thereof disposed on said end of said hose branch to hold said end of said hose branch on said branch of said T-connector.

20. A method of making a branched hose construction as set forth in claim 19 and comprising the step of forming said branch to be angled relative to said body portion of said T-connector.

* * * * *